May 31, 1966 H. H. DIETRICH 3,253,774
REFRIGERATING APPARATUS
Filed Dec. 28, 1964
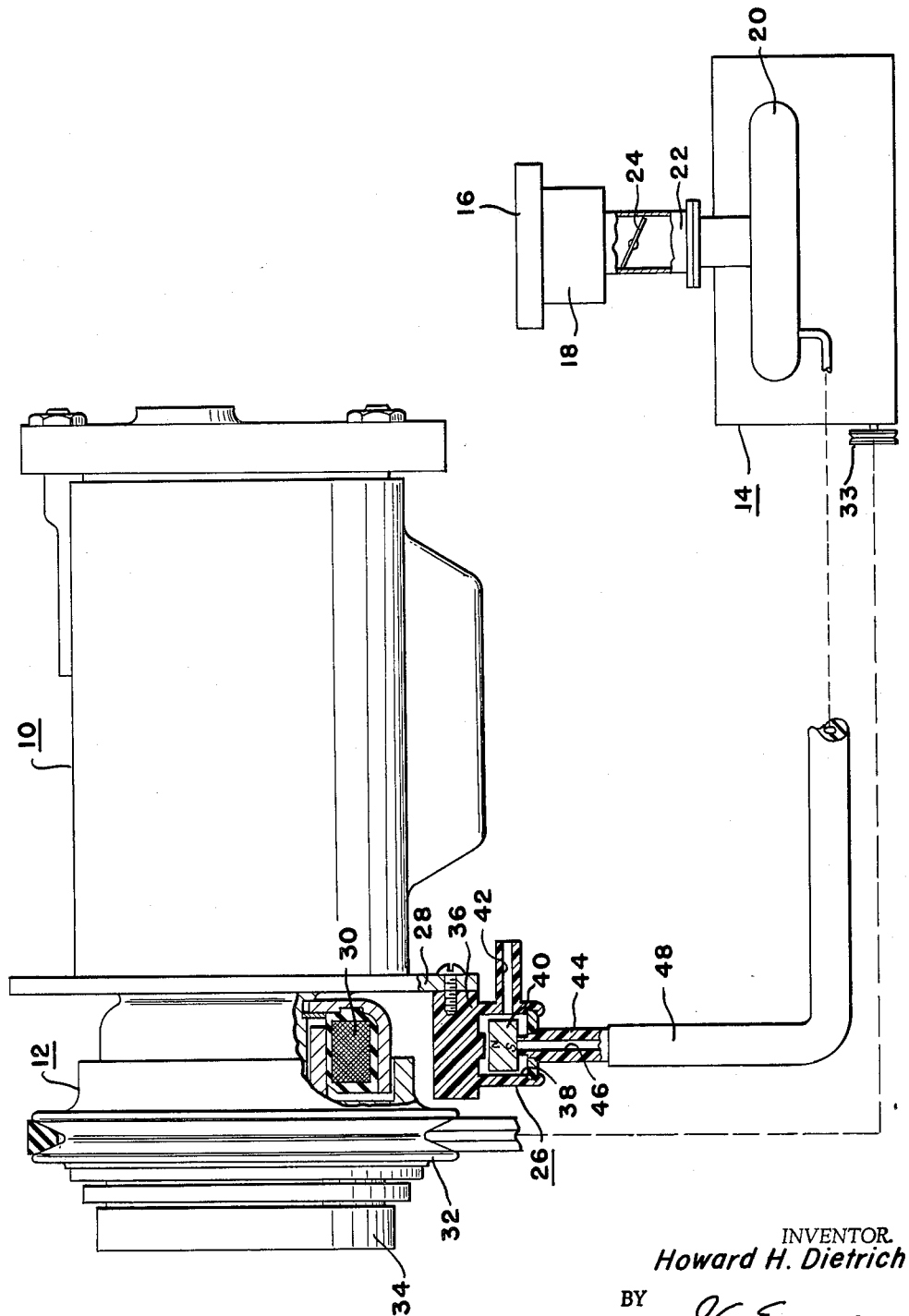
INVENTOR.
Howard H. Dietrich
BY
J.C. Evans
His Attorney 3,253,774
REFRIGERATING APPARATUS
Howard H. Dietrich, Rochester, N.Y., assignor to General Motors Corporation, Detroit, Mich., a corporation of Delaware
Filed Dec. 28, 1964, Ser. No. 421,302
3 Claims. (Cl. 230—11)

This invention relates to automobile air conditioning systems and more particularly to a speed control assembly for regulating the drive speed at idle of a main automobile engine in response to compressor operation.

One problem in many automotive air conditioning systems arises during operation thereof when the engine of the automobile is operating at normal idle settings. In such a case, the power takeoff from the engine is reduced to a point where the refrigerant compressor speed is insufficient for producing a desired refrigerant output for adequate space cooling within the passenger compartment of the vehicle.

Accordingly, an object of the present invention is to increase the idle speed of an engine for driving the compressor of an automotive air conditioning system to maintain a desired space cooling capacity when the automobile is stopped by the provision of means for injecting air into the inlet manifold of the engine in response to compressor operation.

A still further object of the present invention is to improve the operation of automobile air conditioning systems having an engine driven compressor with a magnetic clutch component by the provision of a fluid system including magnetic valve means responsive to the flux field generated by the magnetic clutch for regulating the air fuel ratio to the engine.

Futher objects and advantages of the present invention will be apparent from the following description, reference being had to the accompanying drawing wherein a preferred embodiment of the present invention is clearly shown.

In the drawing:
FIGURE 1 is a schematic view of an automobile air conditioning systems including the idle speed adjustment of the present invention.

In the drawing a subassembly of an air conditioning unit of the type shown in United States Patent No. 2,892,319, issued June 30, 1959, is illustrated including a compressor 10 and a magnetic clutch assembly 12 for drivingly connecting the compressor to a main automobile engine 14. The compressor 10 preferably is a plural piston, double-acting unit of the type shown in United States Patent No. 3,057,545, issued October 9, 1962. The clutch assembly 12 is preferably of the type more specifically set forth in United States Patent No. 3,082,933, issued March 26, 1963. Air and fuel for the engine 14 are supplied through an air cleaner 16 and carburetor 18 into an intake manifold 20 of the engine. In the riser 22 leading to the intake manifold 20 is located a pivoted butterfly or throttle valve member 24.

The system further includes a magnetic valve device 26 secured on the underside of a flange 28 on one end of the compressor 10 that is located in close proximity to a coil 30 selectively energizable to drivingly connect a pulley 32, driven from a power takeoff 33 through a belt indicated schematically by the broken line extending from the engine 14 to the pulley 32 upon movement of an armature component 34 of the clutch in an axial direction along the shaft of the compressor.

The valve 26, more particularly, includes an outer housing 36 forming an internal chamber 38 in which is disposed a movable magnetic valving element 40 having permanent poles formed thereon as illustrated. The body 36 forms an inlet opening 42 in communication with the internal chamber 38 for communicating it with atmosphere and, additionally, has an inlet fitting 44 directed through one wall thereof for forming a second inlet opening 46 to the internal chamber 38. The fitting 44 is connected to a tubular conduit 48 for communicating the opening 46 therein to the interior of the intake manifold.

During periods when the automobile air conditioning system is turned off, the coil 30 is de-energized and the valving element 40 is in the illustrated position where it closes the opening 46 and blocks communication between atmosphere and the conduit 48 to manifold 20. During such operation the throttle valve 24 is preferably positioned by conventional idle speed adjustment means in the carburetor 18 to a position on the rich side.

In accordance with certain of the principles of the present invention, with such an initial throttle position at idle, the idle speed of the engine is increased during operation of the compressor 10 to improve the quantity of the space cooling capacity provided thereby by adding additional air into the intake manifold. More particularly, during periods when the compressor 10 is connected to the engine by energization of the magnetic pulley 12, the flux field from the coil thereof is sufficient to lift the magnetic valve element 40 upwardly, thus opening the inlet opening 46 and directly communicating it with the atmospheric bleed opening 42. Thus, atmospheric perssure is introduced into the chamber 38 to pass through the outlet fitting 44 and conduit 48 into inlet manifold 20. Accordingly, more air mixes with the rich idle mix in the intake manifold to increase the idle speed of the engine and thereby increase the speed of the compressor for maintaining an increased capacity therefrom for improving space cooling in the automobile passenger compartment. Preferably with a system of this type the engine is running hot. Hence, the air conditioning system is operated only following an indication of this fact as for example by a light signal on the dashboard of the vehicle.

While the embodiment of the present invention as herein disclosed constitutes a preferred form, it is to be understood that other forms might be adopted.

What is claimed is as follows:
1. In an automobile air conditioning system, the combination of, an internal combustion engine having an air intake, a throttle valve controlling flow through said intake, a refrigerant compressor driven by said engine, magnetic clutch means for selectively connecting said refrigerant compressor in direct drive relationship with said engine when energized, and permanent magnet means responsive to the magnetic flux field produced by energization of said magnetic clutch for directing additional air into said intake downstream of said throttle valve for increasing the idle speed of said engine when said refrigerant compressor is in operation.

2. An idle speed control system for an internal combustion engine having an inlet manifold comprising, air and fuel supply means for controlling engine operation at a first predetermined idle speed, a refrigerant compressor, an energizable magnetic clutch for operatively connecting said compressor in driving relationship with the engine, a valve having an atmospheric inlet and an inlet connectible to the intake manifold of the engine, and a permanent magnet valving member within said valve responsive to the flux field of said magnetic clutch means when energized to open communication between said manifold and said atmospheric inlet for directing additional air into said intake manifold independently of said air and fuel supply system for increasing the idle speed of said engine when said refrigerant compressor is in operation.

3. In an automobile air conditioning system, the combination of, an internal combustion engine having an inlet manifold, air and fuel supply means including a throttle valve having a first idle position for controlling engine speed at a first idle speed, a refrigerant compressor, magnetic clutch means selectively energizable for operatively connecting said compressor in driving relationship with said engine, a valve having an atmospheric inlet and a second inlet, means for connecting said second inlet in communication with the intake manifold of said engine below said throttle valve, permanent magnet valving member within said valve selectively positioned with respect to said inlets for selectively directing atmospheric air to said manifold, said valving member being responsive to the flux field of said magnetic clutch means when energized to open said second inlet to communicate said inlet manifold with atmosphere for directing additional air thereto independently of said air and fuel supply means to thereby increase the idle speed of said engine when said refrigerant system is in operation.

References Cited by the Examiner
UNITED STATES PATENTS

| | | | |
|---|---|---|---|
| 2,746,395 | 5/1956 | Carpenter | 251—65 X |
| 2,902,055 | 9/1959 | Cowherd | 251—65 X |
| 2,929,226 | 3/1960 | Baker et al. | 62—243 X |
| 3,129,795 | 4/1964 | Goeschel et al. | 192—.084 |

MARK NEWMAN, *Primary Examiner.*

ROBERT A. O'LEARY, *Examiner.*

W. E. WAYNER, *Assistant Examiner.*